July 8, 1952 — A. PANKEN — 2,602,392
FRANKFURTER GRILL

Filed Sept. 20, 1950 — 4 Sheets-Sheet 1

INVENTOR.
Albert Panken
BY
Attorney

INVENTOR.
Albert Panken

July 8, 1952        A. PANKEN        2,602,392
FRANKFURTER GRILL
Filed Sept. 20, 1950        4 Sheets-Sheet 3
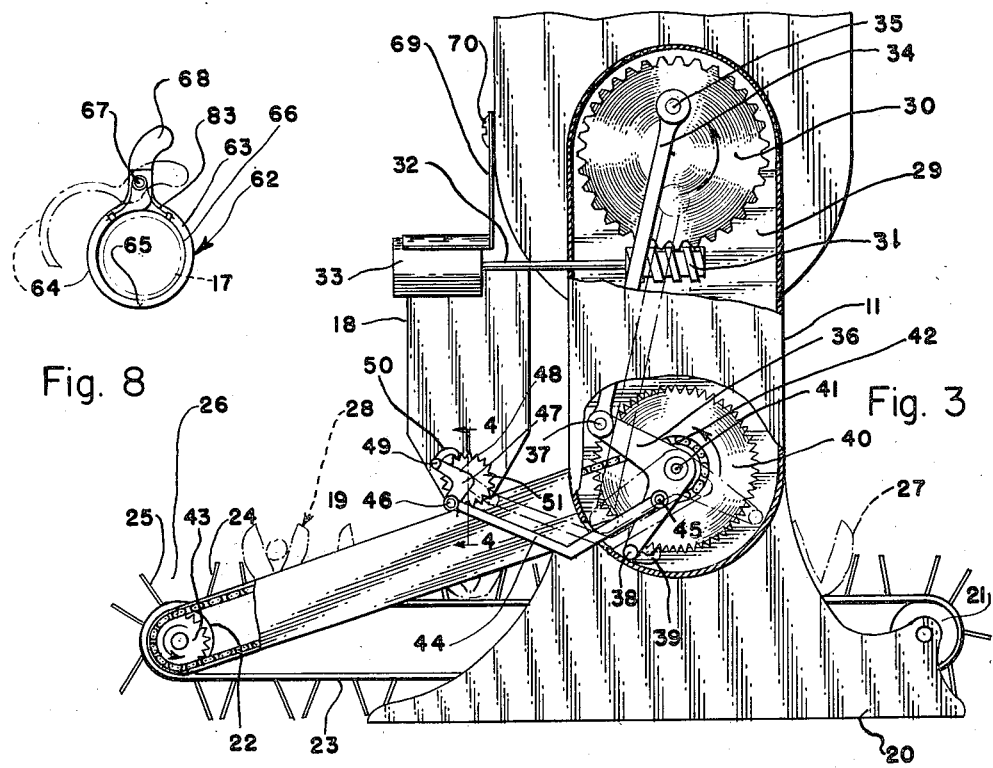
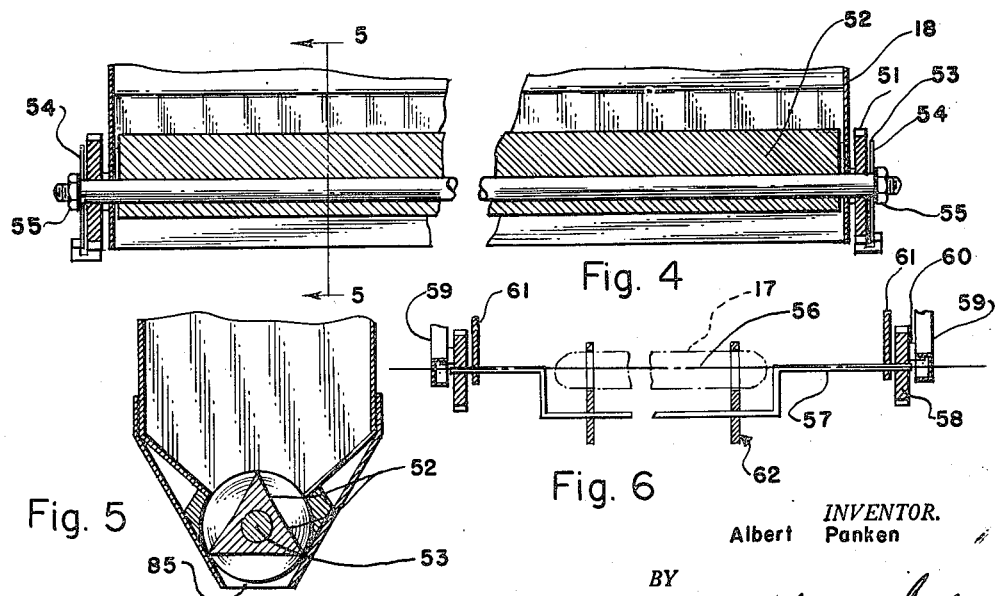
INVENTOR.
Albert Panken
BY
Attorney INVENTOR.
Albert Panken
BY
*David Mowry Stellar*
Attorney Patented July 8, 1952

2,602,392

UNITED STATES PATENT OFFICE 2,602,392

FRANKFURTER GRILL

Albert Panken, Chicago, Ill.

Application September 20, 1950, Serial No. 185,891

9 Claims. (Cl. 99—427)

My invention relates to automatic frankfurter grill and roll assembly devices.

An important object of my invention is to provide a device of the aforementioned character, which is equipped with structural mechanism to automatically feed a frankfurter into gripping fingers which are guided through an oval orbit, and rotated simultaneously during their travel while being grilled by suitable heating elements mounted adjacent the walls of the enclosure of the grill unit, so that when the frankfurters have travelled a complete oval cycle the frankfurters are presumably suitably grilled, and are automatically dropped by the gripping and rotating fingers into a cut roll adapted to receive the said frankfurters, which had been simultaneously fed into proper position by suitable conveyor means, and thus the grilling of the frankfurter and its assembly into a roll is completed.

A still further object of my invention is to provide a device of the aforementioned character which is also equipped with mustard or relish applicator means, which may be automatically and intermittently operated so as to coat the frankfurter with the mustard or relish as it travels by the mustard or relish applicator station or structure.

A still further object of my invention is to provide a device of the aforementioned character in which frankfurters and rolls are fed in progressively and successively, so as to make the operation of grilling frankfurters and assembly with the rolls a continuous and progressive operation.

A still further object of my invention is to provide in a device of the aforementioned character suitable finger means, for holding frankfurters, which is actuated by cam means timing the opening and closing of the said fingers to be either receptive to a frankfurter which is fed thereinto, or for automatically controlling the release of the said frankfurter after completion of the grilling operation.

A still further object of my invention is to provide a frankfurter holding means which includes crank support means so as to hold the frankfurter in position to be rotated about its axis.

A still further object of my invention is to provide a device of the aforementioned character which is equipped with mustard or relish applicator means preferably of polygonal construction so that it will pick up and apply a selected or definite amount of mustard or relish on the frankfurter.

A still further object of my invention is to provide a mustard or relish applicator which has a wiping action in order to deposit a suitable quantity of mustard or relish on a frankfurter.

A still further object of my invention is to provide means for motivating the various elements and structures comprising my invention in order to synchronize them to perform the operations required automatically.

A still further object of my invention is to provide a device of the aforementioned character, which will require filling a feeding tray with frankfurters so that they will be fed by gravity, and feeding or depositing cut rolls on the conveyor mechanism for receiving the grilled frankfurters, the work of the operator being completed when a suitable number of rolls and frankfurters have been deposited in the machine elements to retain them, the remainder of the operations being completed automatically by the machine so that the assembled grilled frankfurter and roll can be removed from the machine when completed and consumed.

A still further object of my invention is to produce a device of the aforementioned character which may be constructed so as to be placed on display to attract the attention of passersby and induce them to purchase the cooked products emanating from the machine.

A still further object of my invention is to provide a device of the aforementioned character which is preferably constructed of sheet metal materials, and which is of such simple elemental construction as to warrant its economical manufacture in quantity production.

Other objects, ancillary advantages, and features resident in my invention will become apparent, to those familiar with the art, from an examination of the accompanying drawings, bearing further elucidation in the ensuing description, wherein like symbols are used to designate like parts, and in which:

Fig. 3 is a view looking in the direction of arrows 3—3 of Fig. 2.

Fig. 4 is a cross-sectional view taken substantially on the lines 4—4 of Fig. 3.

Fig. 5 is a fragmentary cross-sectional view taken substantially on the lines 5—5 of Fig. 4.

Fig. 6 is a view showing the crank retaining and rotating means for the frankfurters, in order to permit them to be motivated or rotated axially.

Fig. 8 is an end view showing the particular finger means for holding the frankfurters during rotation, and for subsequently releasing them after the grilling operation has been completed.

Figure 1:
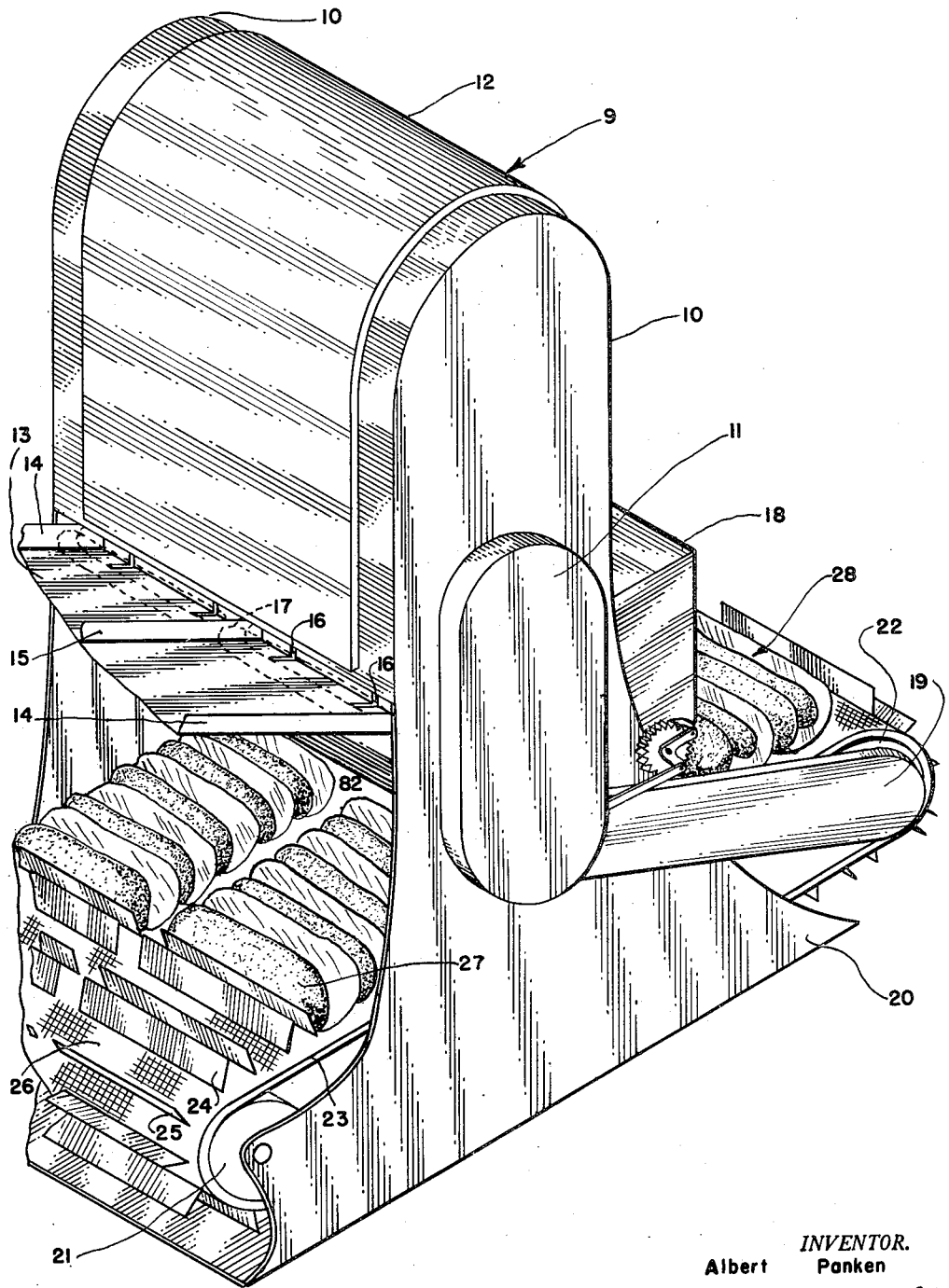
Fig. 1 is a perspective view of my invention.

Referring to the various figures, more particularly to Fig. 1, the general arrangement of the various stations within the device for performing the grilling and assembly of the frankfurter and the roll is indicated; there it will be noted that my invention is generally designated 9, and consists of two end housings 10 terminating in and being connected at their lowermost extremities to form a supporting base 20. Intermediately these ends a cover 12 which is removably associated with the casings 10 is indicated so that the same may be removed for inspection or repair. The cover 12 may be made of transparent plastic material so that the grilling operation can be watched.

Figure 7:
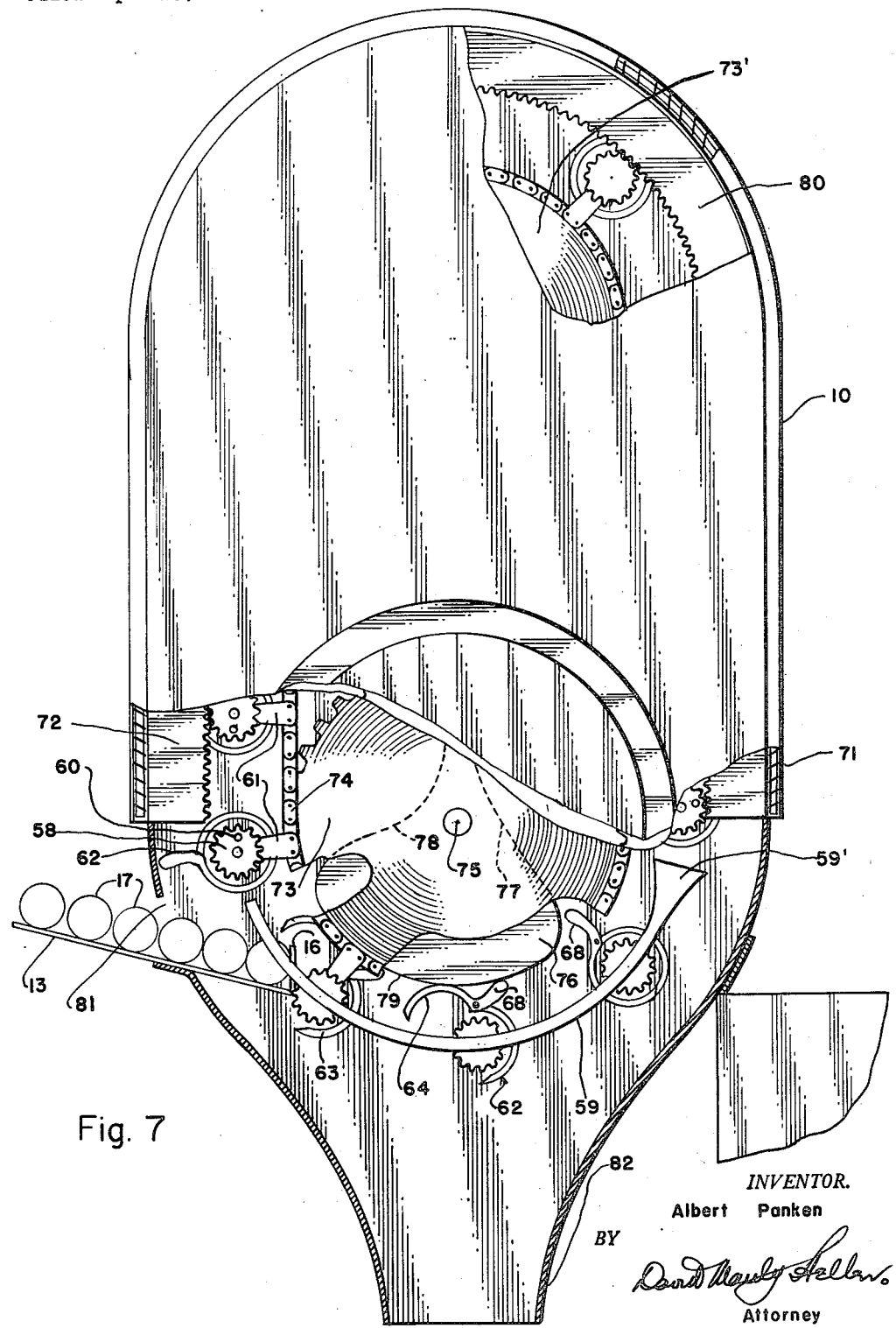
Fig. 7 is an end view of a portion of my machine showing the circuitous path to be traveled by the frankfurters during the grilling operation, and the cam and rack mechanisms in order to control and guide the gearing mechanism thereof to foolproof the operation of the machine.

At the forward part of the machine an inclined feeding tray 13 is shown, on which the frankfurters, designated 17, are supported. The said tray is partitioned in two or more sections divided by the end flanges 14 and the central partition flange 15. Stop fingers 16 are provided at suitable intervals at the front of the said frankfurter feeding chute 13, so as to hold the first frankfurter until it is ready to be grabbed by the finger mechanism, an operation to be later explained. An opening 81 is shown in Fig. 7 for the frankfurters to pass into the grilling confines.

Adjacent the base portion, a conveyor 23 is indicated, which is mounted on rollers 21 and 22 and which is intermittently driven, in order to bring a roll 27 in proper alignment with the outlet 82 from which the grilled frankfurters are dropped when the grilling operation is completed.

On the case or enclosure 10, I show a gear box 11 and a mustard or relish structure generally designated 18. The completed frankfurter and roll are designated 28 and are shown leaving the machine on the conveyor 23 after the grilling and assembly operations have been completed.

The conveyor element 23 is preferably provided with blades 24 and 25 angularly positioned as shown in order to provide the recess 26 for confining therein a cut roll 27 and feed the same intermittently under the outlet 82.

Figure 2:
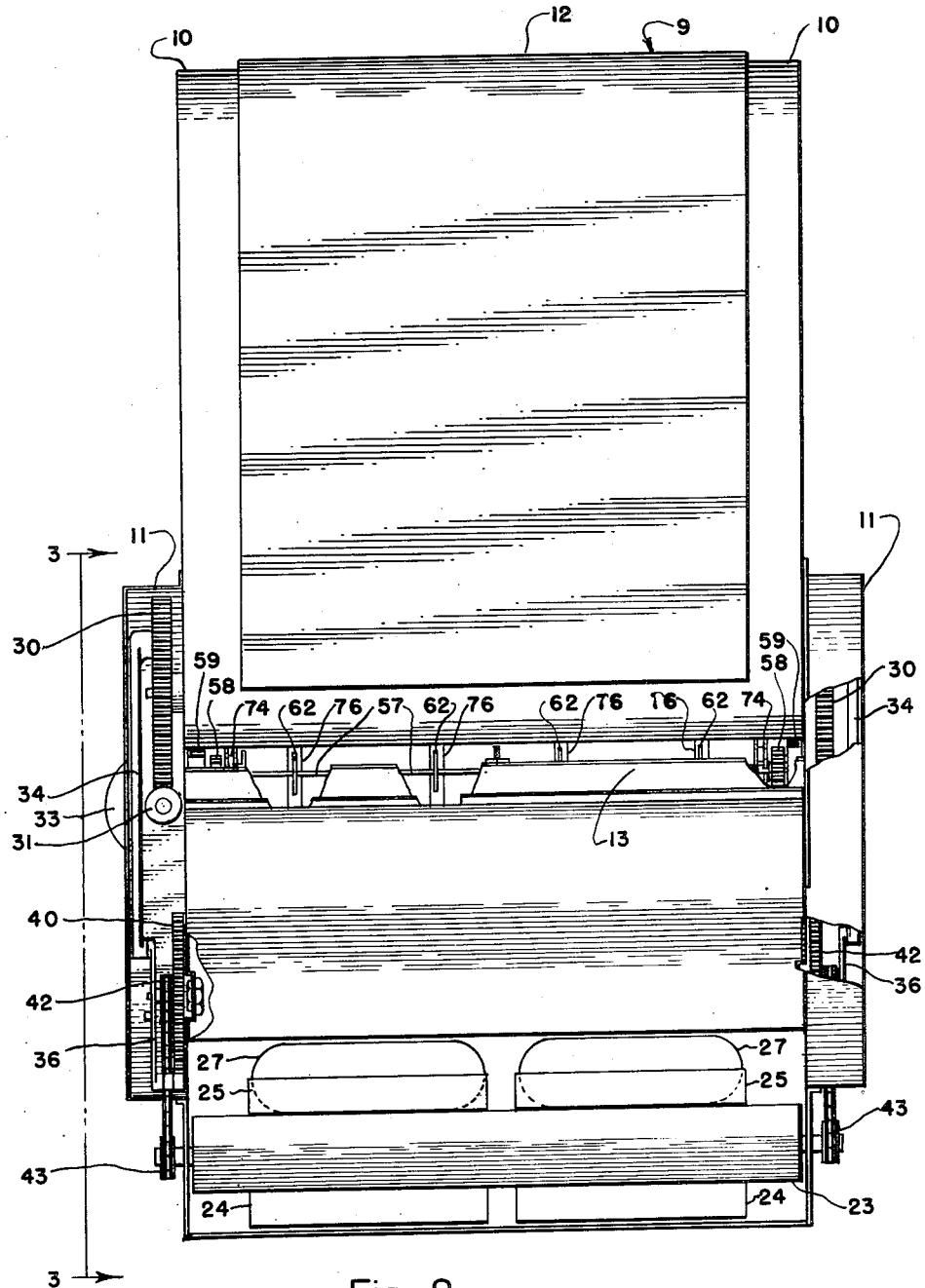
Fig. 2 is a front view looking from the left of the perspective view shown in Fig. 1.

Referring to Figure 2, and more particularly to Figure 3, the gear case, or transmission case 11, is shown with certain portions thereof broken away in order to more clearly indicate the operative mechanism contained within its confines 29.

The drive is provided by a prime mover designated as 33 which has an extended shaft 32 on which is mounted the worm 31. The worm 31 is in meshing relationship with the worm gear 30 which operates and rotates counter-clockwise as indicated by the arrow designated thereon.

On the said worm gear 30 is articulately secured a motivating lever 34 which articulates at 35 so that for each rotation of the worm gear 30 the crank lever 34 will motivate through the full and dotted lines indicated in Fig. 3. The other terminal of the crank lever 34 is articulately secured at 37 to the bell crank element 36 which in turn is pivotally secured at 41, its other terminal portion having articulately secured thereto at 38 the pawl element 39 which engages the teeth of the ratchet 40. Thus, the worm gear 30 by virtue of the crank lever or arm 34, and through the instrumentality of the bell crank 36 pivoted at 41, will rotate the ratchet 40 intermittently.

Sprockets 43 are mounted one at each end of the conveyor 23 and are coordinated and connected by the sprocket chain 42 so that the conveyor 23 is motivated intermittently and will feed the rolls the required distance and thus, also, feed out of the machine the completed assembled product generally designated 28. The sprocket chain 42 is covered by a guard 19 so as to prevent catching of material therein.

The mustard or relish applicator structure 18 is suitably mounted by bracket 69 and securing means such as screws 70. The said structure 18 has a reduced outlet portion 85 on which is mounted preferably the polygonal structure, or triangular applicator 52, which rotates with the shaft 53, the same being mounted in suitable bearings 54 within the framework, and being secured firmly in place on the shaft 53 by means of nuts or other fastening means 55.

Thus, it can be seen that as the triangular distributor or applicator 52 is rotated it will pick up a sufficient amount of mustard or relish, and subsequently drop it through the outlet 85 on the frankfurter, which had been priorly assembled with the roll, and allow it to drop on the roll; thus garnishing the frankfurter with a suitable quantity of mustard or relish.

The intermittent motivation of the shaft 53, and its associated applicator 52, is produced by an articulate connection 45 with the bell crank 36 by the bent lever 44 which is also articulately secured at 46 to another bell crank 48 pivoted at 47, being operated on the shaft 53 so that the pawl 50 which is articulately connected at 49, and is spring-urged will engage the teeth of the ratchet 51, and thus afford an intermittent motion to the ratchet 51, and subsequently to the applicator 52. The lever 44 is preferably bent as indicated in order to afford clearance to the crank arm 34 at its maximum travel of its stroke.

The frankfurter retaining structure is best illustrated in Figs. 6 and 8, wherein it is shown that the gears 58 are rotated, as will subsequently appear as the description progresses, and are fastened to the crank rotating means 57 on which are mounted the holding and releasing fingers generally designated 62 for holding the frankfurter 17 in co-axial relation with axis 56 so that it may be motivated about the said axis 56 when the crank 57 is caused to be motivated.

The finger structure generally designated 62 is illustrated in detail in Fig. 8, wherein it is shown that it consists of the jaws 63 and 64 forming a complete circular confinement for the frankfurter 17 within the confines 66 of the finger structure 62. The finger 63 is stationary and is fixed to the pivoting shaft 67, whereon the finger 64 is motivated to the position indicated in dotted lines. The structure is normally maintained closed by a spring 83, and the termini of the jaws are beveled as shown at 65 in order to form a rigid locking enclosure for the frankfurter 17.

The jaw 64 is provided with a motivating tail portion 68; the object of this structure will be now amplified. Referring to Fig. 7, it will be noted how the frankfurters 17 are placed on the inclined tray, generally designated 13, and held in the proper position by the stop lugs 16. In this structure the casing or enclosure 10 is provided with a heating element 71 which follows substantially the greater part of the oval orbit of travel of the frankfurter during its grilling operation.

The rotating means for the frankfurter is provided by pinion and rack structure 72 which is bent at 80 in order to form a continuous meshing relationship with the individual pinions 58. The motivating pinions 58 are provided with supports 61 which are attached to the sprocket chain 74. The said sprocket chain is motivated by the shaft 75 on which the sprocket 73 is mounted, which together with a companion sprocket 73' provide the oval orbit of travel of the frankfurters mounted on the crank structure 57 heretofore mentioned. The pinions 58 mesh with the gear rack 72 as the sprocket chain 74 causes the pinions 58 to travel the path of the toothed section of the gear rack 72.

At the lowermost portion is mounted in a stationary and rigid manner the cam structure generally designated 76, which has cutaway portions 77 and 78 and an operative portion 79, which serve to open as well as to hold in open position the clamp or finger structure generally designated 62. In order to maintain the motivating pinions 58 in their proper meshing relationship, they are provided with pins 60, which operate within the trackway 59, which is flared out as shown at 59' and thus maintains them in proper meshing relationship when leaving the rack 72, and prior to re-engaging the other terminal portion of the rack 72, so that the operation will be complete.

When the finger elements are brought into proper alignment by virtue of the pins 60 entering the flared out portion 59', and subsequently the trackway 59, the operative portion 68 is in the position indicated to the right of the lower portion of Fig. 7, where it can be seen that the portion 68 is ready to engage the lobe of the cam 76 so as to cause it to assume the open position shown to the left thereof at the time when the frankfurter is to drop through the outlet 82, the grilling operation having been completed. The jaws 63 and 64 of the finger 62 will remain open by virtue of the promontory 79 on the cam 76 so that when the same reach the supporting platform 13, they will enter through suitable slotted portions not shown for clearance and permit a frankfurter 17 to fall within the confines of the lowermost jaw 63. Thus, as the portion 68 passes the other lobe of the cam 76, the spring 83 will tend to close the fingers 63 and 64, thus confining the frankfurter between the said fingers; subsequently, as the travel of the sprocket chain 74 continues, the pinions 58 will be caused to engage the initial terminal portion of the gear rack 72, and thus the cycle of the operation herein just described will be repeated.

It will be noted that I have shown a preferred illustration with two grilling units performing the operation on two rows of frankfurters, and two rows of rolls. The machine may be built to accommodate a single unit, namely, a single row of rolls and a single row of frankfurters, or it may be built in any number of multiple arrangements desired, so as to either increase or decrease the production of said machine as may be required. Thus, it will be noted that the operation of the machine is rather simple, practical and economical. The heating elements are energized by electric current and are suitably connected in a circuit in order to also provide from the same source of supply motivation for the prime mover 33. All an operator is required to do is turn on the switch, allow the machine to become heated to the proper temperature, keep the tray 13 well supplied with frankfurters, and the conveyor 23 well supplied with cut rolls; then remove the assembled products from the conveyor indicated at 28.

The mustard applicator unit may be made to function in coordination with the remainder of the structure, or, when it is preferred, a closure over the outlet 84 may be provided, or the pawl 50 may be disengaged from the ratchet 51, in which event, none of the mustard or relish in the container 18 will be applied.

It is to be understood that changes may be made in the construction as well as in the combination and arrangement of the several parts, provided that such changes fall within the scope of the appended claims.

Having thus disclosed and revealed my invention, what I claim now as new and desire to secure by Letters Patent is:

1. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, and cam means for opening the said grabbing holding and releasing fingers mounted within the orbit of the said sprocket drive means.

2. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, and a reduced frankfurter outlet portion formed at the lower end of the said housings.

3. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, an opening at the front of the said end housings below the terminal portions of the said rack means, an inclined frankfurter feeding tray attached to the front section of the said end housings its lower edge extending into the confines of the said end housings, and stop lugs secured to the lowermost edge of the said feeding tray to restrain the gravitational movement of frankfurters resting on the said feeding tray.

4. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, a reduced frankfurter outlet portion formed at the lower end of the said housings, an opening at the front of the said end housings below the terminal portions of the said rack means, an inclined frankfurter feeding tray attached to the front section of the said end housings its lower edge extending into the confines of the said end housings, and stop lugs secured to the lowermost edge of the said feeding tray to restrain the gravitational movement of frankfurters resting on the said feeding tray.

5. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, a reduced frankfurter outlet portion formed at the lower end of the said housings, an opening at the front of the said end housings below the terminal portions of the said rack means, an inclined frankfurter feeding tray attached to the front section of the said end housings its lower edge extending into the confines of the said end housings, and stop lugs secured to the lowermost edge of the said feeding tray to restrain the gravitational movement of frankfurters resting on the said feeding tray.

6. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, eccentrically mounted pin means on the outer surfaces of the said pinions and at right angles thereto, and arcuate trackway means mounted to span the open portion of the said U-shaped rack means to receive the said pin means in order to control and assure the meshing engagement of the said pinions and the said rack means.

7. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, a reduced frankfurter outlet portion formed at the lower end of the said housings, eccentrically mounted pin means on the outer surfaces of the said pinions and at right angles thereto, and arcuate trackway means mounted to span the open portion of the said U-shaped rack means and in concentric relationship with the cam portion of the said cam means to receive the said pin means in order to control and assure the meshing engagement of the said pinions and the said rack means.

8. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinions mounted rotatably on the said pinion supports and in meshing relationship with the said toothed portion, crank rotating means mounted on the said pinions, grabbing holding and releasing fingers mounted on the said crank rotating means and normally urged to closed position by spring means, cam means for opening the said grabbing holding and releasing fingers mounted within the orbit of the said sprocket drive means, an opening at the front of the said end housings below the terminal portions of the said rack means, an inclined frankfurter feeding tray attached to the front section of the said end housings its lower edge extending into the confines of the said end housings, stop lugs secured to the lowermost edge of the said feeding tray to restrain the gravitational movement of frankfurters resting on the said feeding tray, eccentrically mounted pin means on the outer surfaces of the said pinions and at right angles thereto, and arcuate trackway means mounted to span the open portion of the said U-shaped rack means and in concentric relationship with the cam portion of the said cam means to receive the said pin means in order to control and assure the meshing engagement of the said pinions and the said rack means.

9. A frankfurter grill, comprising a pair of end housings connected at their bottom portions to form a base, heating means of inverted U-shaped configuration secured interiorly of the said end housings, rack means of inverted U-shaped configuration having its toothed portion running parallelly and inwardly of the said heating means and secured adjacent the said heating means, sprocket drive means mounted within the confines of the said end housings and being trained to operate parallelly and inwardly of the said toothed portion, pinion supports mounted perimetrally on the said sprocket drive means, a multiple number of opposed pairs of pinion supports mounted rotatably on the said pinion supports and in meshing relationship with the said toothed portion, crank rotating means mounted on the said pinions, grabbing holding and releasing fingers mounted on the said crank means for opening the said grabbing holding and releasing fingers mounted within the orbit of the said sprocket drive means, a reduced frankfurter outlet portion formed at the lower end of the said housings, an opening at the front of the said end housings below the terminal portions of the said rack means, an inclined frankfurter feeding tray attached to the front section of the said end housings its lower edge extending into the confines of the said end housings, stop lugs secured to the lowermost edge of the said feeding tray to restrain the gravitational movement of frankfurters resting on the said feeding tray, eccentrically mounted pin means on the outer surfaces of the said pinions and at right angles thereto, and arcuate trackway means mounted to span the open portion of the said U-shaped rack means and in concentric relationship with the cam portion of the said cam means to receive the said pin means in order to control and assure the meshing engagement of the said pinions and the said rack means.

ALBERT PANKEN.

REFERENCES CITED

The following references are of record in the file of this patent:

UNITED STATES PATENTS

| Number | Name | Date |
| --- | --- | --- |
| 1,716,266 | Flamm | June 4, 1929 |
| 1,755,699 | Loehr | Apr. 22, 1930 |
| 1,879,146 | Estrin | Sept. 27, 1932 |
| 2,027,002 | Spang | Jan. 7, 1936 |
| 2,337,117 | Lloyd | Dec. 21, 1943 |
| 2,520,067 | Sagen | Aug. 22, 1950 |